(12) United States Patent
Benyamin (10) Patent No.: US 9,053,497 B2
(45) Date of Patent: Jun. 9, 2015

(54) SYSTEMS AND METHODS FOR TARGETING ADVERTISING TO GROUPS WITH STRONG TIES WITHIN AN ONLINE SOCIAL NETWORK

(71) Applicant: CitizenNet Inc., Los Angeles, CA (US)

(72) Inventor: Daniel Benyamin, Los Angeles, CA (US)

(73) Assignee: CITIZENNET, INC., Los Angeles, CA (US)

( * ) Notice: Subject to any disclaimer, the term of this patent is extended or adjusted under 35 U.S.C. 154(b) by 70 days.

(21) Appl. No.: 13/832,059

(22) Filed: Mar. 15, 2013

(65) Prior Publication Data

US 2013/0290091 A1   Oct. 31, 2013

Related U.S. Application Data

(60) Provisional application No. 61/639,703, filed on Apr. 27, 2012.

(51) Int. Cl.
*G06Q 30/00* (2012.01)
*G06Q 30/02* (2012.01)
*G06Q 50/00* (2012.01)

(52) U.S. Cl.
CPC ............ *G06Q 30/0269* (2013.01); *G06Q 50/01* (2013.01); *G06Q 30/0255* (2013.01); *G06Q 30/0251* (2013.01)

(58) Field of Classification Search
CPC .................................................. G06Q 30/0269
USPC ...................................................... 705/14.66
See application file for complete search history.

(56) References Cited

U.S. PATENT DOCUMENTS

| 5,465,309 | A | 11/1995 | Johnson |
| 5,835,087 | A | 11/1998 | Herz et al. |
| 5,999,902 | A | 12/1999 | Scahill et al. |
| 6,515,681 | B1 | 2/2003 | Knight |
| 6,571,225 | B1 | 5/2003 | Oles et al. |
| 6,571,234 | B1 | 5/2003 | Knight et al. |

(Continued)

OTHER PUBLICATIONS

"Automatic Expansion of Domain-Specific Lexicons by Term Categorization", ACM Transactions on Speech and Language Processing, vol. 3, No. 1, May 2006, 1-30.

(Continued)

*Primary Examiner* — John G Weiss
*Assistant Examiner* — Scott C Anderson
(74) *Attorney, Agent, or Firm* — KPPB LLP (57) ABSTRACT

Systems and methods in accordance with embodiments of the invention target advertisements to groups with strong ties in a social network. In one embodiment of the invention, a method for targeting advertising campaigns includes obtaining a set of advertising content, where the advertising content includes advertising keywords and brand data, identifying one or more target members within a set of members associated with an online social network, where the target members are associated with messages on the online social network having target member keywords associated with the advertising keywords, determining a set of member groups within a set of members associated with an online social network, where a member group includes at least one target member and at least one non-target member that is related to at least one of the at least one target member, and targeting a portion of the advertising content to each of the member groups.

18 Claims, 4 Drawing Sheets

(56) References Cited

U.S. PATENT DOCUMENTS

| | | | |
|---|---|---|---|
| 6,766,349 | B1 | 7/2004 | Belkin |
| 7,080,139 | B1 | 7/2006 | Briggs et al. |
| 7,089,226 | B1 | 8/2006 | Dumais et al. |
| 7,421,395 | B1 | 9/2008 | Link et al. |
| 7,603,349 | B1 | 10/2009 | Kraft et al. |
| 7,657,515 | B1 | 2/2010 | Jewell |
| 7,734,627 | B1 | 6/2010 | Tong |
| 7,743,051 | B1 | 6/2010 | Kashyap et al. |
| 7,860,928 | B1 | 12/2010 | Anderson |
| 7,917,528 | B1 | 3/2011 | Dave et al. |
| 7,925,496 | B1 | 4/2011 | Rubin |
| 7,933,818 | B1 | 4/2011 | Kumar et al. |
| 7,941,437 | B2 | 5/2011 | Cooley |
| 8,086,631 | B2 | 12/2011 | Gollapudi et al. |
| 8,301,616 | B2 | 10/2012 | Guha et al. |
| 8,380,697 | B2 | 2/2013 | Benyamin et al. |
| 8,504,550 | B2 | 8/2013 | Hall et al. |
| 8,554,854 | B2 | 10/2013 | Benyamin et al. |
| 2002/0016787 | A1 | 2/2002 | Kanno |
| 2002/0062368 | A1 | 5/2002 | Holtzman et al. |
| 2002/0123928 | A1 | 9/2002 | Eldering et al. |
| 2003/0028595 | A1 | 2/2003 | Vogt et al. |
| 2003/0164855 | A1 | 9/2003 | Grant et al. |
| 2003/0212673 | A1 | 11/2003 | Kadayam et al. |
| 2005/0080613 | A1 | 4/2005 | Colledge et al. |
| 2005/0080856 | A1 | 4/2005 | Kirsch |
| 2005/0204002 | A1 | 9/2005 | Friend |
| 2006/0069589 | A1 | 3/2006 | Nigam et al. |
| 2006/0242128 | A1 | 10/2006 | Goel |
| 2006/0253437 | A1 | 11/2006 | Fain et al. |
| 2006/0282328 | A1 | 12/2006 | Gerace et al. |
| 2007/0033104 | A1 | 2/2007 | Collins et al. |
| 2007/0061195 | A1 | 3/2007 | Liu et al. |
| 2007/0106500 | A1 | 5/2007 | Loofbourrow et al. |
| 2007/0124432 | A1 | 5/2007 | Holtzman et al. |
| 2007/0260580 | A1 | 11/2007 | Omoigui |
| 2007/0288433 | A1 | 12/2007 | Gupta et al. |
| 2008/0021884 | A1 | 1/2008 | Jones et al. |
| 2008/0059488 | A1 | 3/2008 | Iyengar et al. |
| 2008/0091670 | A1 | 4/2008 | Ismalon |
| 2008/0140502 | A1 | 6/2008 | Birnholz et al. |
| 2008/0172368 | A1 | 7/2008 | Chowdhury et al. |
| 2008/0222142 | A1 | 9/2008 | O'donnell |
| 2008/0243842 | A1 | 10/2008 | Liang et al. |
| 2008/0294624 | A1 | 11/2008 | Kanigsberg et al. |
| 2008/0313215 | A1 | 12/2008 | Beker et al. |
| 2009/0049029 | A1 | 2/2009 | Choi et al. |
| 2009/0049127 | A1 | 2/2009 | Juan et al. |
| 2009/0063469 | A1 | 3/2009 | Gross |
| 2009/0070219 | A1 | 3/2009 | D'angelo et al. |
| 2009/0070346 | A1 | 3/2009 | Savona et al. |
| 2009/0100042 | A1 | 4/2009 | Qiao |
| 2009/0109872 | A1 | 4/2009 | Skubacz et al. |
| 2009/0119167 | A1 | 5/2009 | Kendall et al. |
| 2009/0119261 | A1 | 5/2009 | Ismalon |
| 2009/0164464 | A1 | 6/2009 | Carrico et al. |
| 2009/0171686 | A1 | 7/2009 | Eberstadt |
| 2009/0177754 | A1 | 7/2009 | Brezina et al. |
| 2009/0216696 | A1 | 8/2009 | Downs et al. |
| 2009/0234815 | A1 | 9/2009 | Boerries et al. |
| 2009/0276285 | A1 | 11/2009 | Nomula |
| 2010/0049534 | A1 | 2/2010 | Whitnah et al. |
| 2010/0169327 | A1 | 7/2010 | Lindsay et al. |
| 2010/0223279 | A1 | 9/2010 | Scott |
| 2010/0228614 | A1* | 9/2010 | Zhang et al. ............ 705/14.16 |
| 2010/0268628 | A1 | 10/2010 | Pitkow et al. |
| 2010/0293170 | A1 | 11/2010 | Hall et al. |
| 2010/0306249 | A1 | 12/2010 | Hill et al. |
| 2011/0060794 | A1 | 3/2011 | Sweeney |
| 2011/0078130 | A1 | 3/2011 | Roizen et al. |
| 2011/0093336 | A1* | 4/2011 | Calabria ................. 705/14.53 |
| 2011/0093455 | A1 | 4/2011 | Benyamin et al. |
| 2011/0145348 | A1 | 6/2011 | Benyamin et al. |
| 2011/0170777 | A1 | 7/2011 | Inagaki |
| 2011/0231240 | A1 | 9/2011 | Schoen et al. |
| 2012/0004959 | A1 | 1/2012 | Benyamin et al. |
| 2012/0158489 | A1 | 6/2012 | Benyamin et al. |
| 2012/0158518 | A1 | 6/2012 | Benyamin et al. |
| 2012/0259619 | A1 | 10/2012 | Hall |
| 2012/0323674 | A1 | 12/2012 | Simmons et al. |
| 2012/0323905 | A1 | 12/2012 | Qiao |
| 2013/0036107 | A1 | 2/2013 | Benyamin et al. |
| 2013/0179426 | A1 | 7/2013 | Benyamin et al. |
| 2013/0218678 | A1 | 8/2013 | Benyamin et al. |
| 2013/0232154 | A1 | 9/2013 | Hall et al. |
| 2014/0244400 | A1 | 8/2014 | Benyamin et al. |
| 2014/0280178 | A1 | 9/2014 | Benyamin et al. |

OTHER PUBLICATIONS

Acar, E et al., "Modeling and Multiway Analysis of Chatroom Tensors", ISI'05 Proceedings of the 2005 IEEE international conference on Intelligence and Security Informatics, 13.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the Workshop on Machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socio-economic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, , "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Gamon, , "Sentiment classification on customer feedback data: noisy data, large feature vectors, and the role of linguistic analysis", Proceedings of the 20th international conference on Computational Linguistics, Association for Computational Linguistics, 2004, 7 pgs.

Garg, et al., "Understanding Probabilistic Classifiers", Machine Learning: ECML 2001, 2001, 179-191.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jun. 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

(56) References Cited

OTHER PUBLICATIONS

Hein, "How Search Really Works: The Keyword Density Myth", Search Engine People, found on line at www.searchenginepeople.com/blog/how-search-really-works-the-keyword-density-myth.html, Feb. 1, 2008.

Joachims, "Text Categorization with Support Vector Machines: Learning with Many Relevant Features", Universitat Dortmund Fachbereich Informatik, Nov. 1997, 18 pgs.

Kim et al., "Literary Style Classification with Deep Linguistic Analysis Features", Source and date unknown, 7 pgs.

Kintsch, "Predication", Source and date unknown, 40 pgs.

Kintsch, "The Role of Knowledge in Discourse Comprehension: A Construction-Integration Model", Psychological Review, 1988, vol. 95, No. 2, pp. 163-182.

Kramer, "An Unobtrusive Behavioral Model of "Gross National Happiness"", CHI 2010: Language 2.0, Apr. 10-15, 2010, pp. 287-290.

Lerman, "Semantic Labeling of Online Information Sources", Source and date unknown, 19 pgs.

Li et al., "Keyword Extraction for Social Snippets", WWW 2010, Apr. 26-30, 2010, 2 pgs.

Liu, F et al., "Personalized Web Search For Improving Retrieval Effectiveness", IEEE Transactions on Knowledge and Data Engineering, vol. 16, No. 1, Jan. 2004.

Lu et al., "Opinion Integration Through Semi-supervised Topic Modeling", WWW 2008, Refereed Track: Data Mining—Modeling, Apr. 21-25, 2008, pp. 121-130.

Meyer, "Support Vector Machines", Source unknown; Sep. 12, 2011, pp. 1-8.

Mishne, "Experiments with Mood Classification in Blog Posts", Style 2005, 8 pgs.

Pang et al., "Opinion Mining and Sentiment Analysis", Foundations and Trends in Information Retrieval, 2008, vol. 2, Nos. 1-2, pp. 1-135.

Pearlman, "Facebook Ads", The Facebook Blog, found on line at blog.facebook.com/blog.php?post=6972252130, Nov. 6, 2007.

Press, et al., "Numerical Recipes in FORTRAN 77", vol. 1 of Fortran Numerical Recipes: The Art of Scientific Computing, Cambridge University Press, 1992, 5.

Ratkiewicz et al., "Detecting and Tracking the Spread of Astroturf Memes in Microblog Streams", Source unknown, Nov. 2010, 10 pgs.

Scott et al., "Text Classification Using WordNet Hypernyms", Source and date unknown, pp. 45-51.

Sun et al., "Gesundheit! Modeling Contagion through Facebook News Feed", Association for the Advancement of Artificial Intelligence, 2009, 8 pgs.

Tyler et al., "Retrieval Models for Audience Selection in Display Advertising", CIKM 2011, 6 pgs.

Wallach, "Topic Modeling: Beyond Bag-of-Words", Source unknown, Jun. 26, 2006, 40 pgs.

Wilson et al., "Term Weighting Schemes for Latent Dirichlet Allocation", Human Language Technologies: The 2010 Annual Conference of the North American Chapter of the ACL, pp. 465-473.

Zheng et al., "A Framework for Authorship Identification of Online Messages: Writing-Style Features and Classification Techniques", Journal of the American Society for Information Science and Technology, 2006, vol. 57, No. 3, pp. 378-393.

\* cited by examiner

SYSTEMS AND METHODS FOR TARGETING ADVERTISING TO GROUPS WITH STRONG TIES WITHIN AN ONLINE SOCIAL NETWORK

CROSS-REFERENCE TO RELATED APPLICATIONS

The present application claims priority to U.S. Provisional Patent Application No. 61/639,703 to Benyamin, titled "Systems and Methods for Targeting Advertising to Groups with Strong Ties within an Online Social Network" and filed Apr. 27, 2012, the disclosure of which is hereby incorporate by reference in its entirety.

FIELD OF THE INVENTION

The present invention generally relates to online advertising and more specifically to the targeting of display advertising to groups on online social networks.

BACKGROUND

Recent advances in online advertising have most prominently been in the field of behavioral targeting. Both web sites and networks tailor their online experiences to individuals or classes of individuals through behavioral targeting. When employed by advertising networks ("ad networks"), behavioral targeting matches advertisers that have a certain desired target audience with websites that have been profiled to draw a specific audience. One of the challenges in behavioral targeting is determining the true extent of the match between a desired audience and the actual audience drawn by a specific web page.

Online social networks, such as the Facebook service provided by Facebook, Inc. of Palo Alto, Calif., are ad networks that have very good knowledge of the visitors to specific pages within the online social network. In order to visit a page within a social network, one typically needs to be a member of the social network. In addition, members of social networks typically provide demographic information and information concerning interests in order to personalize their behavior. For example, a Facebook member could indicate that they are interested in ski vacations to Lake Tahoe by clicking a "Like" button featured on a Lake Tahoe website. A simple advertising strategy would be to target the members of an online social network who have previously indicated interest in the product or service being offered by the advertisement. A flaw with this strategy, however, is that many members that are interested in the advertised offer are not being targeted, because they have not previously indicated a desire for the products or services. A campaign can be further targeted using keywords to narrow the audience for an advertisement to people who have interests that correlate with the advertised offer. In many ad networks, advertisers can bid on keywords. Therefore, targeting users associated with a first keyword can cost significantly more money than targeting users associated with a second keyword. Returning to the example of an advertiser of ski travel packages to Lake Tahoe, the question becomes: who are others that may be interested in a Lake Tahoe vacation package beyond those that have specifically expressed an interest in such a vacation? Probably those who like specific ski resorts would be good candidates, and possibly those who like specific ski manufacturers. What about those who like gambling? Since the Lake Tahoe area also features a number of casinos, the desired audience for the offer could include members that like to ski and like to play poker. However, not all who like to play poker are good candidates for such a vacation package, and as such, advertisement budgets may not be wisely spent on such an audience.

SUMMARY OF THE INVENTION

Systems and methods in accordance with embodiments of the invention target advertisements to groups with strong ties in an online social network. In one embodiment of the invention, a method for targeting advertising campaigns includes obtaining a set of advertising content using an advertising targeting server system, where the advertising content includes advertising keywords and brand data, identifying one or more target members within a set of members associated with an online social network using the advertising targeting server system, where the target members are associated with messages on the online social network having target member keywords associated with the advertising keywords, determining a set of member groups within a set of members associated with an online social network using the advertising targeting server system, where a member group includes at least one target member and at least one non-target member that is related to at least one of the at least one target member, and targeting a portion of the advertising content to each of the member groups using the advertising targeting server system, where the targeted portion of the advertising content includes advertising keywords associated with the target member keywords corresponding to the target member included in a group of members.

In another embodiment of the invention, targeting advertising campaigns further includes generating an advertising campaign using the advertising targeting server system, where the advertising campaign includes a portion of the advertising content and the targeting information and transmitting the advertising campaign to an online social network using the advertising targeting server system, where the online social network is configured to present the portion of the advertising content to the members of the online social network based on the targeting information.

In an additional embodiment of the invention, targeting advertising campaigns further includes measuring the performance of the advertising campaign using the advertising targeting server system.

In yet another additional embodiment of the invention, measuring the performance of the advertising campaign further includes obtaining a set of messages related to the advertising campaign within the online social network using the advertising targeting server system, where the messages were posted by members of the online social network and determining if the members that posted the messages in the set of messages are associated with the member groups targeted by the advertising campaign using the advertising targeting server system.

In still another additional embodiment of the invention, determining the set of member groups further includes clustering the target members into one or more member groups based on the messages posted by each of the target members using the advertising targeting server system, where target members within the same member group express similar intents based on the messages posted by the target members in the same member cluster, associating at least one member who is not a target member with each of the member groups based on relationships between the at least one member and the target member within the online social network using the advertising targeting server system, predicting the interest level with respect to the advertising content of each of the member groups based on the messages posted by the target members in the member group using the advertising targeting server system, and estimating the connectedness of the member groups based on the members in each of the member groups using the advertising targeting server system.

In yet still another additional embodiment of the invention, targeting advertising campaigns further includes generating an advertising strategy for each of the member groups based on the connectedness of a member group and the predicted interest level using the advertising targeting server system.

In yet another embodiment of the invention, targeting advertising campaigns further includes generating an advertising campaign budget based on the connectedness of a member group and the predicted interest level using the advertising targeting server system.

In still another embodiment of the invention, the connectedness of a member group is a measure of the likelihood that a given member group will share a piece of advertising content with a second member group within the online social network.

In yet still another embodiment of the invention, at least one member is a seed group, where the seed group does not include a target member.

In still another additional embodiment of the invention, targeting advertising campaigns further includes targeting a second portion of the advertising content to the seed group using the advertising targeting server system, where the targeting information associated with the second portion of the advertising content includes a second set of advertising keywords that differ from the advertising keywords.

Yet another embodiment of the invention includes an advertising targeting server system including a processor and a memory connected the processor and configured to store an advertising targeting application, wherein the advertising targeting application configures the processor to obtain a set of advertising content, where the advertising content includes advertising keywords and brand data, identify one or more target members within a set of members associated with an online social network, where the target members are associated with messages on the online social network having target member keywords associated with the advertising keywords, determine a set of member groups within a set of members associated with an online social network, where a member group includes at least one target member and at least one non-target member that is related to at least one of the at least one target member, and target a portion of the advertising content to each of the member groups, where the targeted portion of the advertising content includes advertising keywords associated with the target member keywords corresponding to the target member included in a group of members.

In yet another additional embodiment of the invention, the advertising targeting application further configures the processor to generate an advertising campaign, where the advertising campaign includes a portion of the advertising content and the targeting information and transmit the advertising campaign to an online social network, where the online social network is configured to present the portion of the advertising content to the members of the online social network based on the targeting information.

In still another additional embodiment of the invention, the advertising targeting application further configures the processor to measure the performance of the advertising campaign.

In yet still another additional embodiment of the invention, the advertising targeting application further configures the processor to obtain a set of messages related to the advertising campaign within the online social network, where the messages were posted by members of the online social network and determine if the members that posted the messages in the set of messages are associated with the member groups targeted by the advertising campaign.

In yet another embodiment of the invention, advertising targeting application further configures the processor to cluster the target members into one or more member groups based on the messages posted by each of the target members, where target members within the same member group express similar intents based on the messages posted by the target members in the same member cluster, associate at least one member who is not a target member with each of the member groups based on relationships between the at least one member and the target member within the online social network, predict the interest level with respect to the advertising content of each of the member groups based on the messages posted by the target members in the member group, and estimate the connectedness of the member groups based on the members in each of the member groups.

In still another embodiment of the invention, the advertising targeting application further configures the processor to generate an advertising strategy for each of the member groups based on the connectedness of a member group and the predicted interest level.

In yet still another embodiment of the invention, the advertising targeting application further configures the processor to generate an advertising campaign budget based on the connectedness of a member group and the predicted interest level using the advertising targeting server system.

In yet another additional embodiment of the invention, the connectedness of a member group is a measure of the likelihood that a given member group will share a piece of advertising content with a second member group within the online social network.

In still another additional embodiment of the invention, at least one member is a seed group, where the seed group does not include a target member.

In yet still another additional embodiment of the invention, the advertising targeting application further configures the processor to target a second portion of the advertising content to the seed group, where the targeting information associated with the second portion of the advertising content includes a second set of advertising keywords that differ from the advertising keywords.

DETAILED DESCRIPTION OF THE INVENTION

Turning now to the drawings, systems and methods for targeting advertising to groups of members with strong ties within an online social network in accordance with embodiments of the invention are illustrated. An online social network is a term that can be used to describe any online service where individual users can generate and/or upload content. In many instances, users can utilize an online social network to participate in the creation, review, and/or distribution of content posted by members of the online social network. While the term online social network is commonly used to describe sites like the Facebook service provided by Facebook Inc. and the Twitter service provided by Twitter, Inc. that have a highly social component, the term is equally applicable to e-commerce websites that provides the ability for users to post reviews and/or any other sites that allow users and/or members to post any form of content. Online social networks, such as Facebook and Twitter, have become a popular method by which people that are members of the online social network share information and keep up to date on their friends by posting updates (including messages) for their friends to see. Likewise, members log onto these networks to view the latest news and updates from their friends via a news feed. Many online social networks do not show all updates from friends within a member's news feed, but selectively displays them based on an estimate of how strongly connected the member is to a particular person. If a member engages often with a particular person, then updates from that person are more likely to appear in the member's news feed.

In order to monetize the interactions of members with an online social network, advertisements are presented alongside (or incorporated in) the member's news feed. In accordance with embodiments of the invention, these advertisements are targeted toward the member being presented with the advertisements. Systems and methods for determining advertising targeting opportunities in online social networks that can be utilized in accordance with embodiments of the invention are disclosed in U.S. patent application Ser. No. 12/467,981, titled "Social Advertisement Network" to Benyamin et al. The advertisements are a portion of an advertising campaign designed to advertise a set of products and/or services on the online social network. Systems and methods for generating advertising campaigns using advertising targeting information based on user posts on online social networks are disclosed in U.S. patent application Ser. No. 13/331,950, titled "Systems and Methods for Automatically Generating Campaigns using Advertising Targeting Information based upon Affinity Information Obtained from an Online Social Network" to Benyamin et al. To effectively target members of an online social network, the members are clustered into groups to facilitate the targeting of advertisements to the members of the groups. Members are clustered into groups based on the messages and content the members post to the online social network, where the messages and content include keywords, phrases, and/or expressed affinity (and/or intent) with respect to a variety of topics, products, and services. Systems and methods for clustering users in accordance with embodiments of the invention are disclosed in U.S. patent application No. Ser. 13/277,209, titled "Generation of Advertising Targeting Information Based upon Affinity Information Obtained from an Online Social Network" to Benyamin et al.

Advertising targeting server systems in accordance with embodiments of the invention are configured to identify strong ties between members of an online social network. These 'strong ties' are important to identify as they represent the members or users of an online social network that are most interested in hearing information from each other. The determination of strong ties involves determining the members whose opinions matter the most to a user and who interact with the user a sufficient amount to indicate that the members and the users share common interests and/or values with respect to a particular topic. For example, a user's parents can be considered a strong tie, but if they do not live in the same city as the user, may not be a strong tie when it comes to updates about the latest popular bars and restaurants opening in the user's neighborhood. Instead, a member that is a friend of the user and who shares similar tastes in food can be a strong tie when it comes to these matters, but not necessarily other topics. Since word-of-mouth is considered to be a highly successful form of marketing, it is extremely valuable for an advertiser to reach only those groups of people who are likely to virally distribute (i.e. cause the information to be shared) with other users. Therefore, estimating the portions of users of an online network that represent a group including members having strong ties with each other for a given topic has important marketing implications. Based on these strong ties, advertising targeting server systems are configured to determining targeting information for products and/or services to be advertised to the members of the online social network. In a variety of embodiments, the advertising targeting server systems generate advertising campaigns including the targeting information and the product data and transmit the advertising campaigns to an online social network (or other advertising provider) to be presented to the targeted groups of members in the online social network. In several embodiments, the performance of the advertising campaigns is measured and can be used to improve the targeting of advertisements to the targeted groups.

The disclosures of U.S. patent application Ser. Nos. 12/467,981, 13/227,209, and 13/331,950 are hereby incorporated by reference in their entirety. Systems and methods for identifying groups of users with strong ties and targeting advertising to the identified groups within an online social network in accordance with embodiments of the invention are discussed further below.

Advertising Targeting Systems

Figure 1:
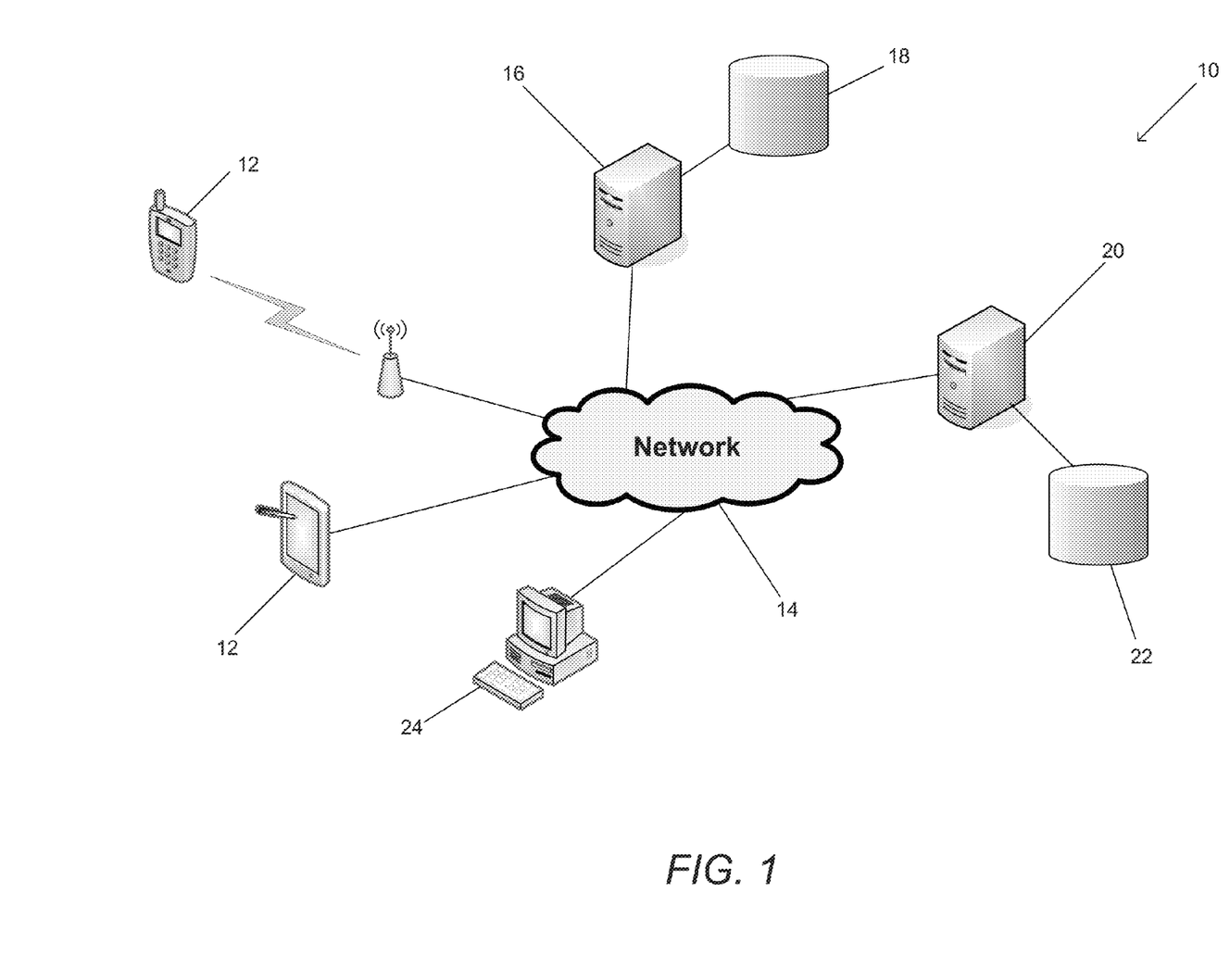
FIG. 1 is a network diagram showing an advertisement targeting system configured to generate targeting information for offers presented via an online social network in accordance with an embodiment of the invention.

An advertising targeting system in accordance with an embodiment of the invention is illustrated in FIG. 1. In the advertising targeting system 10, users are able to utilize network devices 12 that are network 14 connected to communicate with online social network servers 16. Typically, an online social network server 16 is connected to an online social network database 18 containing profile pages of members of the online social network that is updated in real time by member activities (e.g. status updates, messages, shares, likes, etc. . . . ) and various other forms of content (e.g. pictures, videos, music, etc. . . . ) uploaded to the online social network. In many instances, application programming interfaces (APIs) enable third parties to obtain information or data from the online social network concerning member profiles and activities performed by members (i.e. activities associated with a member profile) and provide applications such as online social games via an online social network. In the illustrated embodiment, an advertising targeting server 20 is configured to access profile information, including activities associated with the member profiles, from the online social network servers 16 via APIs or similar mechanisms. The data obtained by the advertising targeting server 20 is processed and utilized to build an advertising targeting database 22 containing member profiles including demographic information and affinities associated with specific keywords. The advertising targeting server 20 is configured to cluster the member profiles of the online social network into groups by processing the activity data associated with the member profiles of the online social network.

Advertisers can utilize an advertising device 24 to provide advertising information concerning offers for products and/or services to the advertising targeting server 20. The advertising targeting server 20 generates a listing of targeting keywords that will target the offer to members of the online social network based upon the affinity information and an advertising strategy. In many embodiments, the advertising targeting server 20 automatically generates an advertising campaign by selecting a group of member profiles matched to an advertising strategy and then targeting additional groups of member profiles with strong ties to members of the selected group.

In a variety of embodiments, advertising targeting server 20 includes a processor configured by software to perform the processes described herein. A specific advertising targeting system is described above with respect to FIG. 1; however, a variety of systems, including those where advertising device 24 and advertising targeting system 20 are implemented using the same device (or set of devices) can be utilized in accordance with embodiments of the invention. Methods for clustering members of an online social network with strong ties into groups and targeting advertising to those groups in accordance with embodiments of the invention are described below.

Groups of Members within an Online Social Network

Figure 2:
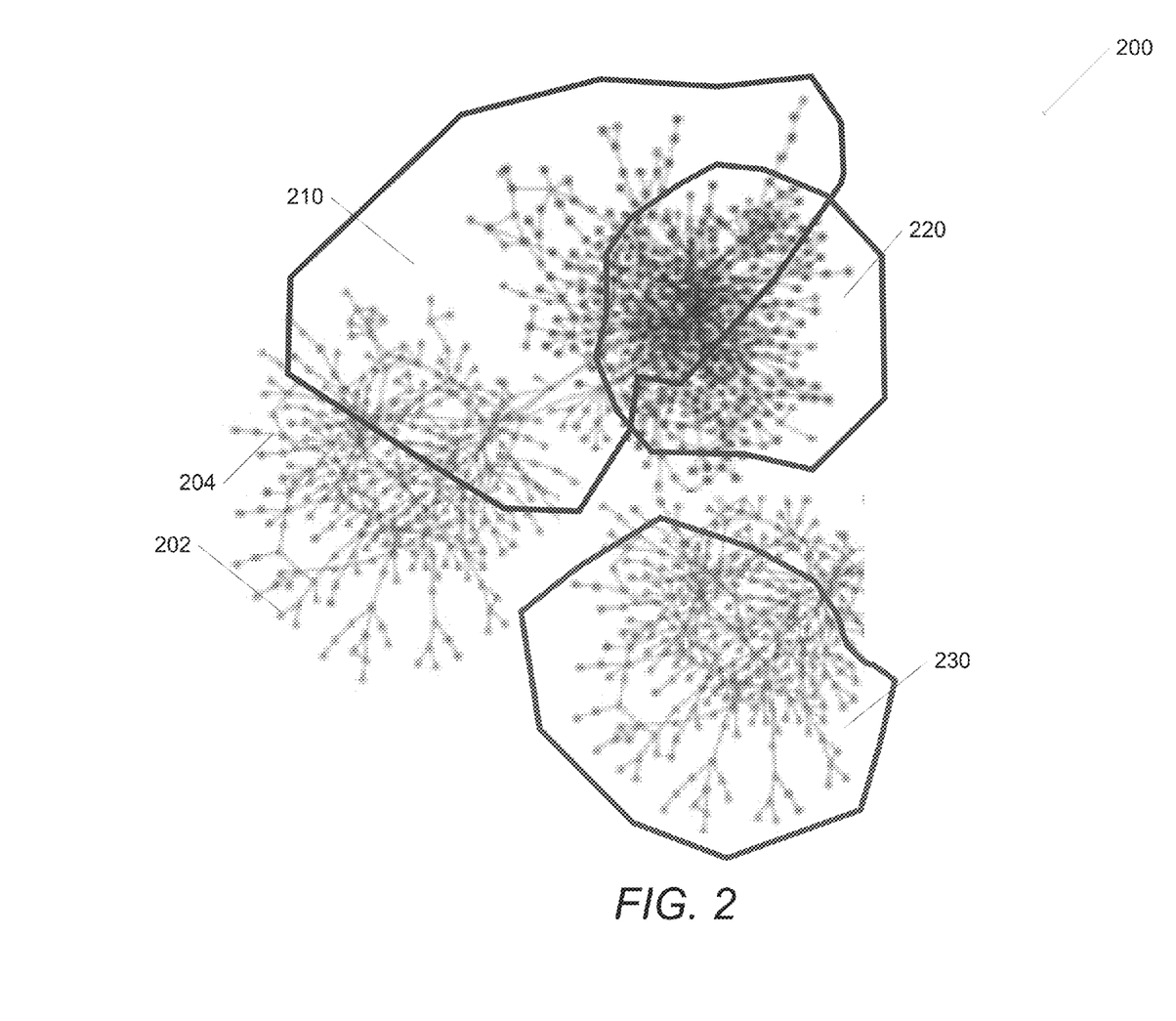
FIG. 2 is a conceptual illustration of groups of members within an online social network utilized in advertisement targeting systems in accordance with an embodiment of the invention.

As described above, advertising campaigns contain advertisements targeted toward groups of members of an online social network having strong ties with each other in order to improve the reach and effectiveness of the advertising campaign. Advertising targeting server systems in accordance with embodiments of the invention are configured to target groups of members of an online social network for advertising. An illustration of members of an online social network is illustrated in FIG. 2. The members of an online social network 200 are represented as a graph, where a member 202 is a node and a relationship between members is an edge 204 within the graph. Relationships between members can be determined in a variety of ways including those described above. In the illustrated embodiment, several clusters of members can be seen. As is discussed below, members within in the same cluster or group tend to have strong ties.

Within the online social network 200, a customer group 210 includes the members of an online social network that are already customers of or otherwise expresses a positive affinity toward a particular product, service, and/or topic related to the advertising campaign. For example, the members can have purchased a product, subscribed to an email list, or engaged with the brand being advertised in some manner. Likewise, the members could have posted messages on the online social network including keywords and/or intent associated with the advertisements and/or other targeting information included in the advertising campaign. Other actions, such as likes, shares, and upvotes, can also be associated with the members within the customer group 210 as appropriate to the requirements of a specific application in accordance with embodiments of the invention.

A viral group 220 of members of the online social network 200 contains members of the social network that are not direct customers of the products and/or services being advertised in the advertising campaign. The members within the viral group 220, however, do have relationships (as indicated by edges spanning members in the viral group 220 with members in the customer group 210) with the members in the customer group 210 even though they do not fall within the customer group 210. Based on the quantity and the quality of the relationships between the members in the viral group 220 and the customer group 210, the viral group 220 can exhibit strong ties with the customer group 210. As is discussed further below, the strength of the ties between the two groups can be based on the number of overlapping members between the groups, although other factors can be utilized in determining the strength of the ties between two or more groups as appropriate to the requirements of a specific application in accordance with embodiments of the invention. Based on the strength of the ties between the groups, a determination can be made as to the likelihood of viral (or social) sharing of an advertisement between the members of the groups. The stronger the ties between two groups, the more likely that an advertisement (or other content) introduced into one group with be virally shared with members of the other group. Likewise, ties between three or more groups can be analyzed in a variety of ways in accordance with embodiments of the invention, such as by comparing sub-pairs of groups within the three or more groups.

The online social network 200 also includes a seed group 230 of members, where no members within the seed group 230 have any relationships with the members of the customer group 210 as indicated by the lack of edges connecting members in the seed group 230 with the customer group 210 or the viral group 220. Due to the lack of relationships between the customer group 210 and the seed group 230, members of the seed group 230 are unlikely to organically hear (e.g. hear by word of mouth or other viral propagation via posts on the online social network) about a piece of content such as an advertisement (i.e. branded content) from the members of the customer group 210. However, this does not mean that seed group 230 is not interested in the product and/or services that are advertised as part of the advertising campaign. By analyzing the messages and intents of the members of the seed group 230, advertisements (possibly differing from those targeted toward the customer group 210 and/or the viral group 220) can be targeted toward the members of the seed group 230. The members of seed group 230 can then virally share the advertisements to other groups that exhibit strong ties with the seed group 230.

Although a specific representation of members of an online social network is described above and illustrated in FIG. 2, any variety of representations of members of an online social network can be utilized as appropriate to the requirements of a specific application in accordance with embodiments of the invention. Processes for clustering members within an online social network and targeting advertising to those members in accordance with embodiments of the invention are discussed below.

Targeting Advertising to Groups in Online Social Networks

Based on the content of advertisements, groups of members of an online social network who have expressed affinity to the advertisements can be targeted to receive the advertisements. Advertising targeting server systems in accordance with embodiments of the invention are configured to identify groups of members having strong ties to other groups of members to serve advertisements to those members who are most likely to engage in the viral distribution of the advertising content. A process for targeting advertising to groups of members within an online social network in accordance with embodiments of the invention is conceptually illustrated in FIG. 3. The process 300 includes obtaining (310) advertising content. Groups of members are determined (312) and advertisements are targeted (314). In many embodiments, an advertising campaign is created (316) and transmitted (318). In a variety of embodiments, the performance of the advertising campaign is measured (320).

Figure 3:
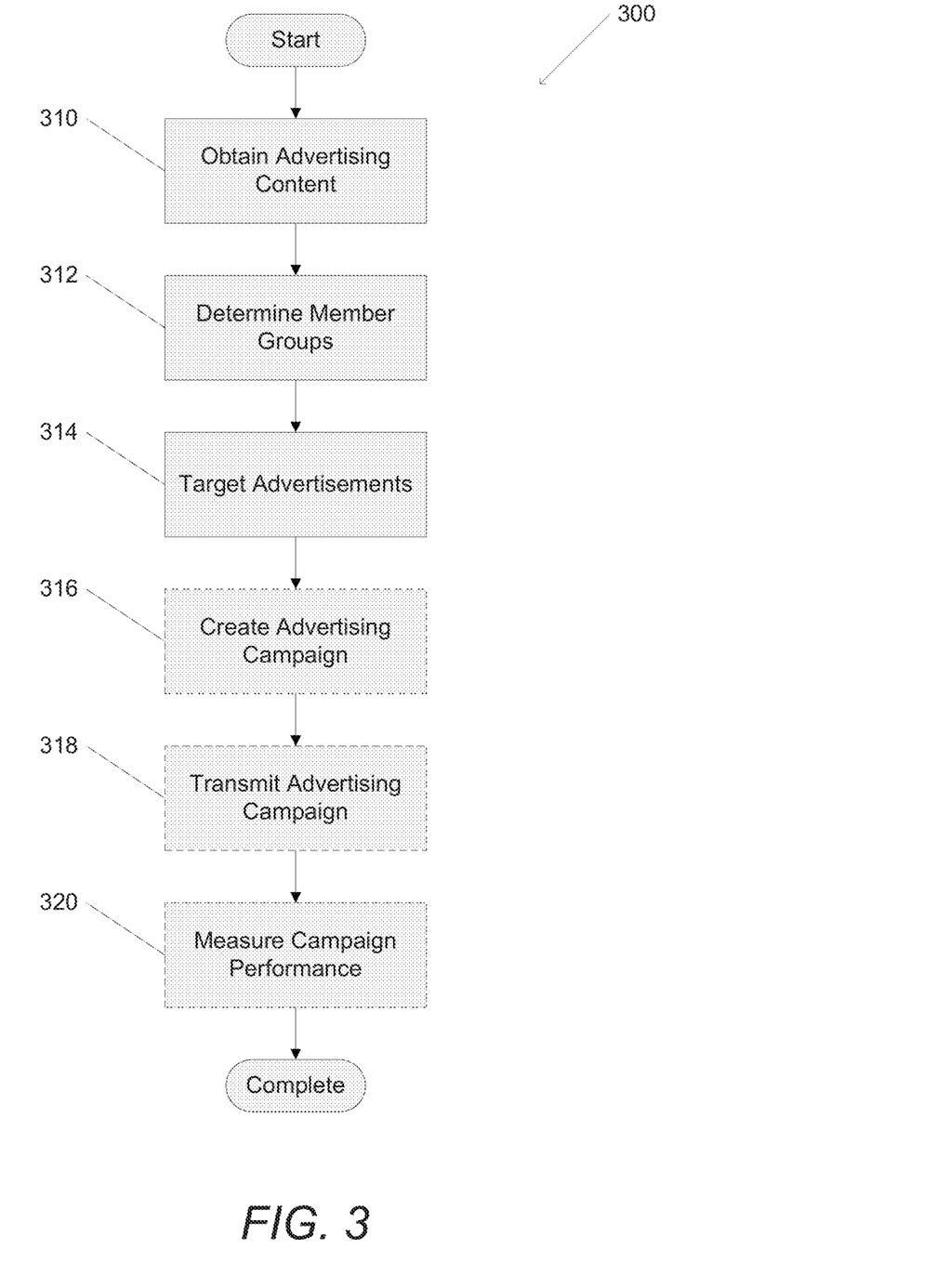
FIG. 3 is a flow chart conceptually illustrating a process for targeting advertisements to groups of members of an online social network in accordance with an embodiment of the invention.

In several embodiments, advertising content is obtained (310) from an advertiser and/or a manufacturer of a product, where the advertising content includes targeting information and keywords associated with a product and/or service. In a number of embodiments, determining (312) member groups includes identifying representative members within an online social network that have posted messages or other content containing keywords associated with the keywords present in the advertising content and/or have otherwise expressed affinity for the products and/or services being advertised. In many embodiments, determining (312) the groups of members includes identifying members within the online social network that exhibit strong ties with the representative members and clustering those members into groups. In a variety of embodiments, advertisements are targeted (314) to the determined (312) groups. Advertisements can be specifically targeted (314) to one or more groups based on the members associated with a particular group.

In several embodiments, an advertising campaign is created (316) including targeting information based on the targeted (314) advertisements and the obtained (310) advertising content, where the targeting information identifies the groups of members that the obtained (310) advertising content should be presented to. In a number of embodiments, the advertising campaign is transmitted (318) to an online social network to be served to the determined (312) groups of members. The performance of the advertising campaign can be measured (320) in a variety of ways including click-through rates, conversion rates, sales, impressions. In many embodiments, measuring (320) the performance of the advertising campaign includes determining how many times the advertisements (and/or products being advertised) are mentioned in messages posted by members of the determined (312) member group(s) within the online social network. In other words, measuring (320) the performance of the advertising campaign includes determining the viral sharing effects of the advertising content within the advertising campaign. In a variety of embodiments, the measured (320) performance information can be utilized to improve the targeting of advertisements to groups of members within the online social network.

Although a specific process for targeting advertising to groups of members within an online social network is described above with respect to FIG. 3, any of a variety of processes can be utilized in accordance with embodiments of the invention. Methods for identifying groups with strong ties within an online social network are described below.

Identifying Groups with Strong Ties in Online Social Networks

Figure 4:
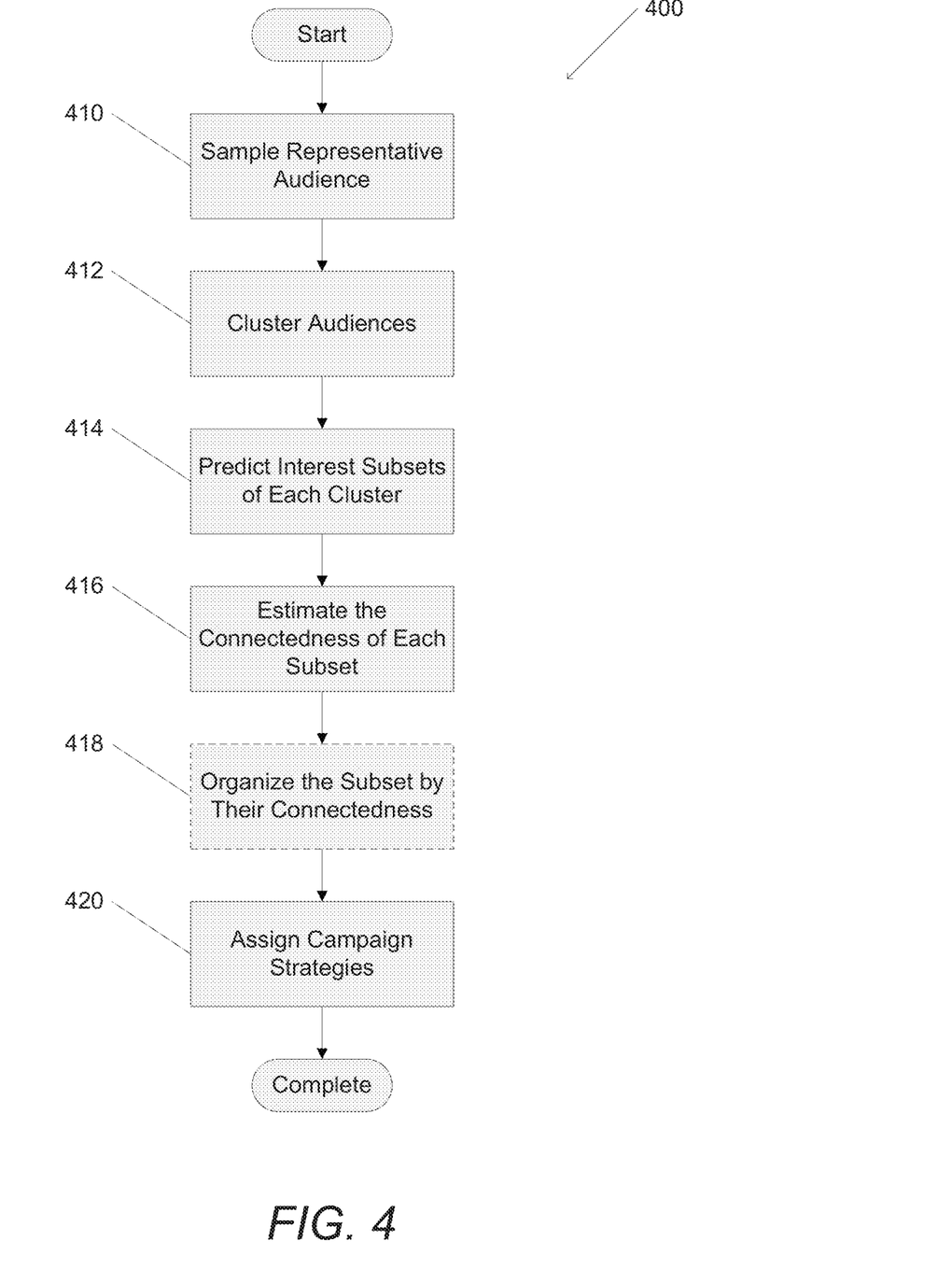
FIG. 4 is a flow chart conceptually illustrating a process for identifying groups with strong ties within an online social network in accordance with an embodiment of the invention.

Members of an online social network tend to cluster into groups based on the relationships between the users. As described above, members clustered into groups may all be interested in similar products and/or services. Advertising targeting server systems in accordance with embodiments of the invention are configured to identify groups of members based on the interests expressed by the clustered members. A process for identifying groups of members with strong ties within an online social network in accordance with an embodiment of the invention is illustrated in FIG. 4. The process 400 includes sampling (410) a representative audience of members of the online social network who are interacting with relevant content (e.g. a brand or product name, or branded content for instance). In many embodiments, sampling (410) a representative audience would include analyzing information useful for marketing purposes, including, but not limited to, age, sex, location, interests, and dislikes associated with members of the online social network. In a variety of embodiments, sampling (410) a representative audience includes identifying keywords within content posted by the members and determining the interests, likes, and/or dislikes of the members based on the identified keywords.

The members in the representative audience are clustered (412). In several embodiments, clustering (412) members utilizes the keywords and/or affinities determined based on messages posted by members of the representative audience on the online social network. Clustering (412) the representative members identifies relationships between the members, where the relationships indicate strong ties between the representative members within the online social network based on the keywords and/or affinities.

For each audience cluster, a prediction (414) is made regarding which subset or subsets of the clustered (412) members would likely be interested in a particular set of advertising content. In a variety of embodiments, the prediction (414) is based on keywords and/or other information (e.g. brand, product type, etc. . . . ) associated with the advertising content as compared to the keywords and/or affinities associated with the members within the audience cluster. In several embodiments, a prediction (414) is made based on identifying members that are known to be customers of the brand associated with the advertising content and/or members that have expressed a positive affinity for the target brand(s) and/or product(s). Likewise, if members within an audience cluster have indicated a negative affinity for the target brands or products, a prediction (414) can be made that audience cluster is not interested in receiving the advertising content.

In many embodiments, the connectedness of the predicted (414) interested subsets of members is estimated (416), where the connectedness of a set of subsets of members is a measure of the strength of the ties between the subsets of members. A variety of classifications can be utilized in accordance with embodiments of the invention in order to estimate groups (e.g. subsets of members) that may or may not receive natural word of mouth communication about the advertisement. In a number of embodiments, the extent to which connections exist between members of identified clusters within a social network can be utilized to identify clusters that are likely to virally distribute content. The term connectedness can be utilized to describe the extent to which groups of members of an online social network are connected via direct and/or indirect links within a social network. In several embodiments, the connectedness of each subset is estimated (416) by querying an advertising server and/or an online social network to determine the portion of members within each subset that have already engaged with an advertisement and/or the brand associated with the advertisement. The percentage of members within the subset that have engaged with the advertisement can be utilized as an estimated (416) connectedness measure. As noted above, other connectedness measures indicating the strength of ties between groups of members can be utilized as appropriate to the requirements of a specific application in accordance with embodiments of the invention. In many embodiments, an advertising targeting server system is configured to utilize a predetermined connectedness threshold to determine whether targeting advertising to a specific group is likely to initiate viral distribution of the advertisement. For example, a group with a connectedness measure above a threshold value (e.g. greater than 75%) could be considered "viral" (i.e. likely to distribute the content to other members within the group) and advertising targeted to such groups in preference to groups that are not "viral" in that they demonstrate a level of connectedness below the threshold value. In this way, the advertising targeting server system can leverage the relationships between members within the online social network to target advertising to the members of the online social network that fall within clusters of members that are likely to virally distribute the content. Effectively, the advertising targeting server system is predicting the clusters of members that are likely to virally distribute the advertisement or other branded content. Such viral distribution can create a multiplier effect relative as the viral distribution causes the advertisement to have additional audience reach at little or no cost to the advertiser. Likewise, multiple thresholds can be defined and advertising dollars can be allocated according to the likelihood that the members within the group will share or otherwise consume the advertising content.

In a number of embodiments, the advertisements are associated with an advertising campaign strategy. In several embodiments, subsets of members are organized (418) into groups by their connectedness and advertising campaign strategies are assigned (420) to each group of members. In a number of embodiments, the groups of members identified by the process include targeting instructions that can be passed to an advertising server and/or an online social network. When assigning (420) advertising campaign strategies to each group of members, the viral groups may receive a majority of the advertising campaign budget since the viral groups already have traction with respect to the advertisements in the campaign. Likewise, non-viral groups and groups with negative affinity may receive different or no advertisements (or advertising budget) as part of the campaign strategy.

A specific process and examples for determining groups of members within a social network based on the interests of the members are described above with respect to FIG. 4; however, a variety of processes for identifying groups of members with strong ties within an online social network and targeting advertising to the identified groups can be utilized in accordance with embodiments of the invention.

Although the present invention has been described in certain specific aspects, variations to the embodiments presented herein are possible without departing from the spirit and scope of the present invention. For example, ties between groups can be performed across multiple online social networks for the purposes of advertising presented by a single online social network or multiple online social networks. In addition, approximating ties between groups can be performed across a single online social network and used for advertising presented via a different online social network. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for targeting advertising campaigns, comprising:
   obtaining a set of advertising content data using an advertising targeting server system including at least one computer with a processor and memory, where the advertising content data comprises advertising keywords and brand data;
   identifying at least one target member within a set of member data associated with an online social network using the advertising targeting server system, wherein:
   the set of member data comprises member relationship data describing the relationships associated with each member in the set of member data;
   the target members in the set of member data are associated with message data provided by the online social network having target member keywords associated with the advertising keywords and brand data, where the target member keywords comprise a positive affinity toward the set of advertising content data; and
   the relationship member data describes a relationship between each target member and the brand data; identifying at least one seed member within the set of member data associated with the online social network using the advertising targeting server system, wherein:
   the seed members within the set of member data are associated with seed member message data provided by the online social network having seed member keywords associated with the target member keywords; and
   the relationship member data does not describe a relationship between the seed members and the target members; determining a set of member groups within a set of member data associated with an online social network using the advertising targeting server system, where a member group comprises at least one target member in the set of member data and at least one seed member in the set of member data;
   generating targeting data targeting a portion of the advertising content data to each of the member groups in the set of member data using the advertising targeting server system, where the targeted portion of the advertising content data comprises advertising keywords associated with the target member keywords corresponding to the target member included in a group of member data; and
   providing the targeting data in response to a request for the targeting data.

2. The method of claim 1, further comprising:
   generating an advertising campaign using the advertising targeting server system, where the advertising campaign comprises a portion of the advertising content and the targeting information; and
   transmitting the advertising campaign to an online social network using the advertising targeting server system, where the online social network presents the portion of the advertising content to the members of the online social network based on the targeting information.

3. The method of claim 2, further comprising measuring the performance of the advertising campaign using the advertising targeting server system.

4. The method of claim 3, wherein measuring the performance of the advertising campaign further comprises:
   obtaining a set of messages related to the advertising campaign within the online social network using the advertising targeting server system, where the messages were posted by members of the online social network; and
   determining if the members that posted the messages in the set of messages are associated with the member groups targeted by the advertising campaign using the advertising targeting server system.

5. The method of claim 1, wherein determining the set of member groups further comprises:
   clustering the target members into one or more member groups based on the messages posted by each of the target members using the advertising targeting server system, where target members within the same member group express similar intents based on the messages posted by the target members in the same member cluster;
   associating at least one member who is not a target member with each of the member groups based on relationships between the at least one member and the target member within the online social network using the advertising targeting server system;

predicting the interest level with respect to the advertising content of each of the member groups based on the messages posted by the target members in the member group using the advertising targeting server system; and estimating the connectedness of the member groups based on the members in each of the member groups using the advertising targeting server system.

6. The method of claim 5, further comprising generating an advertising strategy for each of the member groups based on the connectedness of a member group and the predicted interest level using the advertising targeting server system.

7. The method of claim 6, further comprising generating an advertising campaign budget based on the connectedness of a member group and the predicted interest level using the advertising targeting server system.

8. The method of claim 6, wherein the connectedness of a member group is a measure of the likelihood that a given member group will share a piece of advertising content with a second member group within the online social network.

9. The method of claim 1, further comprising:

identifying a second portion of the advertising content, wherein:

the second portion of the advertising content is associated with the messages provided by the target members; and the second portion of advertising content is not associated with the seed member message data; and targeting the second portion of the advertising content to the seed group using the advertising targeting server system, where the targeting information associated with the second portion of the advertising content comprises a second set of advertising keywords that differ from the advertising keywords.

10. An advertising targeting server system, comprising:

a processor; and a memory connected the processor and storing an advertising targeting application;

wherein the advertising targeting application directs the processor to:

obtain a set of advertising content, where the advertising content comprises advertising keywords and brand data;

identify one or more target members within a set of member data associated with an online social network, wherein:

the target members in the set of member data are associated with message data provided by the online social network having target member keywords associated with the advertising keywords, where the target member keywords comprise a positive affinity toward the set of advertising content data;

the set of member data comprises member relationship data describing the relationships associated with each member in the set of member data;

identify at least one seed member within the set of member data associated with the online social network, wherein:

the seed members within the set of member data are associated with message data provided by the online social network having seed member keywords associated with the brand data; and the relationship member data does not describe a relationship between the seed members and the target members;

determine a set of member groups within the set of member data associated with an online social network, where a member group comprises at least one target member in the set of member data and at least one seed member in the set of member data; and generating targeting data targeting a portion of the advertising content to each of the member groups in the set of member data, where the targeted portion of the advertising content comprises advertising keywords associated with the target member keywords corresponding to the target member included in a group of members; and provide the targeting data in response to a request for the targeting data.

11. The system of claim 10, wherein the advertising targeting application further directs the processor to:

generate an advertising campaign, where the advertising campaign comprises a portion of the advertising content and the targeting information; and transmit the advertising campaign to an online social network, where the online social network is configured to present the portion of the advertising content to the members of the online social network based on the targeting information.

12. The system of claim 11, wherein the advertising targeting application further directs the processor to measure the performance of the advertising campaign.

13. The system of claim 12, wherein the advertising targeting application further directs the processor to:

obtain a set of messages related to the advertising campaign within the online social network, where the messages were posted by members of the online social network; and determine if the members that posted the messages in the set of messages are associated with the member groups targeted by the advertising campaign.

14. The system of claim 10, wherein the advertising targeting application further directs the processor to:

cluster the target members into one or more member groups based on the messages posted by each of the target members, where target members within the same member group express similar intents based on the messages posted by the target members in the same member cluster;

associate at least one member who is not a target member with each of the member groups based on relationships between the at least one member and the target member within the online social network;

predict the interest level with respect to the advertising content of each of the member groups based on the messages posted by the target members in the member group; and estimate the connectedness of the member groups based on the members in each of the member groups.

15. The system of claim 14, wherein the advertising targeting application further directs the processor to generate an advertising strategy for each of the member groups based on the connectedness of a member group and the predicted interest level.

16. The system of claim 15, wherein the advertising targeting application further directs the processor to generate an advertising campaign budget based on the connectedness of a member group and the predicted interest level using the advertising targeting server system.

17. The system of claim 15, wherein the connectedness of a member group is a measure of the likelihood that a given member group will share a piece of advertising content with a second member group within the online social network.

18. The system of claim 10, wherein the advertising targeting application further directs the processor to:

identify a second portion of the advertising content, wherein:

the second portion of the advertising content is associated with the messages provided by the target members; and the second portion of advertising content is not associated with the seed member message data; and target the second portion of the advertising content to the seed group, where the targeting information associated with the second portion of the advertising content comprises a second set of advertising keywords that differ from the advertising keywords.

\* \* \* \* \*